E. LINDNER.
Magazine Fire-Arm.
No. 415. Reissued Dec. 23, 1856.
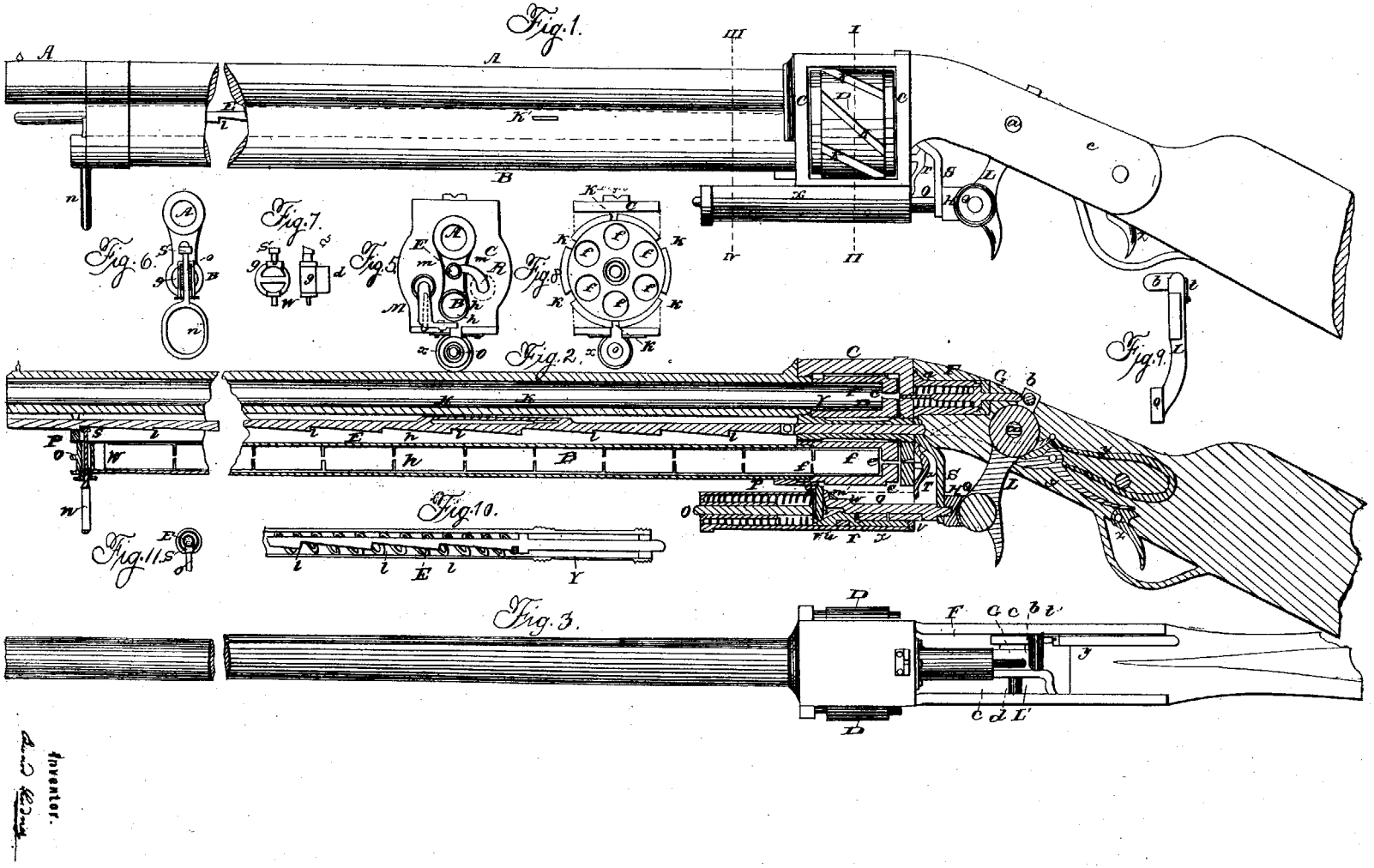
Inventor.
N. PETERS, PHOTO-LITHOGRAPHER, WASHINGTON, D. C.

UNITED STATES PATENT OFFICE.

EDWARD LINDNER, OF NEW YORK, N. Y.

IMPROVED MAGAZINE, REPEATING, AND NEEDLE GUN.

Specification forming part of Letters Patent No. 11,197, dated June 27, 1856; Reissue No. 415, dated December 23, 1856.

*To whom it may concern:*

Be it known that I, EDWARD LINDNER, of the city, county, and State of New York, have invented certain new and useful Improvements in Magazine, Repeating, and Needle Guns; and I do hereby declare that the following is a full, clear, and exact description of the same, reference being had to the accompanying drawings, making part of this specification, and to the letters of reference marked thereon, which indicate the same parts in the different figures wherever they occur.

Figure 1 is a side view of a gun; Fig. 2, a longitudinal section, and Fig. 3 a top view, of the same. Figs. 5, 6, 7, 8, 9, 10, 11 are views and sections of different parts of the above, and will be more particularly mentioned in the following description of the construction and arrangement of the various parts of the gun.

A is the barrel, screwed into the frame C, which frame has two side plates or projections, *c c*. These plates are the means by which the whole is securely fastened to the wooden butt of the gun.

B is the cartridge-barrel, which is likewise screwed into the frame C. This barrel is made very light, and has two slots, *h h*, Figs. 2 and 5, one at the upper and one at the lower side, running very nearly the whole length, which serve as guides to the piston W. This piston is cylindrical at its forward end, having an oblong piece, *g*, at its after end, which projects above and below into the slots *h h*, and is fitted to slide easily therein.

A rod, O, passes vertically through the square part *g*, which is bored out sufficiently in its interior to contain a helical spring, which keeps the head *s* of the rod O bearing upon the notched face of the rack E with a yielding pressure.

The lower end of the rod O is furnished with a thumb-ring, *n*, to facilitate the removal of the piston W from the barrel B. The barrel of the gun A and the cartridge-barrel B are connected together by two side plates, *m m*, Fig. 5, in such a manner that the rack E and the projection of the piston W can move freely between the plates. At the fore end a guide, *p*, for the rack E is fastened between the side plates.

E is a rack, a portion of which at each end is cylindrical. At the fore end it is guided in the piece *p*, as above described, and at the rear end it passes through and is guided by the center piece, Y, which is screwed into the frame C. Besides these guides at both ends a long slot, K, is formed about the center of the rack, Fig. 2, into which a steel key, K′, Figs. 1 and 2, is fitted so as to support and guide it.

On the lower side of the rack E teeth *l* are formed, all of the same size, and corresponding in length exactly to the length of the cartridge. The number of teeth correspond with the number of cartridges the barrel B is intended to contain.

At the after end of the rack E an arm, S, is firmly attached and connected with the rod O, as will be hereinafter described.

D is a cylindrical revolving breech-piece, exactly fitted and ground into the frame C, and turns upon the center piece or arbor, Y. This breech-piece contains six chambers, *f f*, as shown in Figs. 8 and 2 in end view and section. These chambers are only bored in part of the way to about the length of the cartridges. A small hole, *e*, is bored completely through in the axis of each chamber, for the purposes hereinafter explained.

T is the locking-spring, fastened near the middle of the frame C, Fig. 2, having a pin, *e′*, attached to it, which, after passing through a corresponding hole in the frame C, enters one of the holes *e* in the breech-piece D, thereby locking the breech-piece firmly in position, for the purpose of insuring that the charged chambers shall be in a line with the barrel A before the firing takes place, and an empty chamber opposite to the cartridge-barrel B to receive a fresh charge. The locking-spring T is thrown out of this position by a projection, *w*, attached to the rod O when it is required that the breech-piece should be turned.

*x* is a tube or box fastened on the lower side of the frame C, as shown in Figs. 1 and 2, which contains the rod O, provided with a helical spring, P, and which rod I shall call the "spring-rod."

The spring-rod has a collar, *q*, forged on, against which the spring P bears. This collar is bored through to receive the pin V, by which the breech-piece D is turned.

The pin V rests upon a sliding piece, U, which is fastened to the under side of the spring-rod O by screws passing through a slot in such a manner as to allow the same to slide backward and forward, but at the same time to go with the spring-rod when the latter is moved.

The sliding piece U has two projections, *r* and *v*, so placed that while it is carried along with the spring-rod O, it will be stopped at the proper place by coming in contact with the back end of the tube *x*, while the spring-rod finishes its motion.

Where the pin V rests upon the sliding piece U the latter is made wedge-shaped, by which means the pin V will be raised or depressed. To insure always a fair bearing of the pin V against the proper surface of the wedge-shaped part of the sliding piece U, this pin is provided with a small spring, *m'*.

The spring-rod O is guided in the tube *x*. The head H is screwed onto the end of the spring-rod, and fastens the lower end of the arm S thereto. The arm S serves to communicate motion from the rod O to the rack E.

The head H rests against the lower rounded part, Q, of the hammer L. On the upper side of the spring-rod O is the projection *w*, which acts upon the locking-spring T, as before described.

On the outside of the breech-piece D are six grooves, *k k*, Figs. 1 and 8, turned on spirally, and in which the pin V is made to work, and turn thereby the breech-piece by every movement one-sixth part round, by which operation a charged hole is each time brought into a line with the barrel A, and an empty hole or chamber opposite the cartridge-barrel B. The revolving breech-piece D is turned down at each end flush with the bottom of the grooves *k k*, upon which the pin V rises up to the next groove after having turned the breech-piece one-sixth part round.

When the spring-rod O is relieved from the pressure of the hammer L it is forced out by the reaction of the spring P, and moves the rack E backward through the arm S, by which means the piston W is likewise brought back, pushing one cartridge into one of the empty chambers of the breech piece D, as this motion is just equal to the length of one cartridge. When the rack E is again moved forward the inclined plane forming the back of a tooth, *l*, (leading from one perpendicular front to the front of the next,) forces the pin *o* of the piston W down, allowing thereby the rack to slide over it to its former position, while the piston W remains stationary, when the head S of the pin *o* engages with the front of the following tooth, ready for the next action.

Fig. 5 is a section through the line III IV, showing the front face of the frame C, with the arrangement of the ramming-hammer and cleaning-brush. M is the ramming-hammer, fastened on the front side of the frame C, so arranged that its action shall drive the charge home when one of the chambers, *f*, which has just received a charge shall be brought opposite to it. It is acted upon through its arm X' by the pin V after the said pin has turned the breech-piece one-sixth part round.

Between the hammer M and the face of the frame is a small spring, *o'*, which forces the hammer M out of the chamber *f* as soon as the arm *f'* is relieved from the action of the pin V. R is the cleaning-brush, situated on the opposite side of the frame to the ramming-hammer, and is likewise arranged to come opposite to one of the chambers *f*. It is connected with the rack E by an arm, receiving therefrom a backward and forward motion, thereby cleaning the chambers alternately as they are brought round after having been discharged.

The gun herein described is intended to be discharged by a needle or punch suddenly perforating the rear end of a cartridge which contains a portion of fulminating-powder or other material which ignites by friction or concussion.

F is a box, secured to the frame C in a line with the barrel A, containing the needle-carrier G, with the discharging-needle *n*. A coiled spring abuts against a collar upon the carrier G, Fig. 2, and bears with its other end against the frame C, by which the needle *n* is always forced out and kept out of the revolving breech-piece, except when pressed in by the hammer L. The needle-carrier G, with its collar, acts as a guide to the needle *n*.

L is the hammer, turning on the pin *a*, secured in the side plates, *c c*. This hammer is provided with stops or catches, in connection with the trigger, spring, &c., in the usual way. The upper end of the hammer L, which has to force the needle into the charge, carries a jointed arm, *b*, the joint of which is so constructed as to stop the arm at a position perpendicular to the hammer L, where it is held by the small spring *t*. The arm *b* rests against the end of G when the gun is cocked; but when the hammer is released it forces the needle into the cartridge, and, striking the inclined piece Z', is forced upward, allowing the needle to be rapidly withdrawn by the reaction of its spring, the rear end of G passing under the arm *b*. When the gun is recocked the pressure of the spring *t* brings the arm *b* to its former position.

By the arrangement of the Prussian needle-gun the needle is secured to a small fly-spring carrier, acted upon by a spring, which carrier is disengaged by drawing the trigger of the gun, when the spring darts the needle into the cartridge to effect the discharge. The needle remains in the gun until it is recocked, and is subjected to be heated to a detrimental degree and injured by the corrosive action of the gases. By my improved arrangement the needle is withdrawn at the instant of the discharge, by which any heating of the needle is effectually prevented.

The action of the gun is as follows: After the cartridge-barrel B has been filled with cartridges, the piston W is put in with the cylindrical part inward. The upper end of the same will then fit in one of the teeth *l* of the rack E. Then move the rack three times backward and forward, when the revolving breech-piece D will have been charged in four chambers, and the gun is ready for service. Now pull the trigger Z, when the hammer will be set at liberty, pressing the needle into the charge and igniting the same, thereby discharging the gun. By this action the spring P forces the rod O outward, taking with it the rack E, through the connecting-arm S, whereby the piston W is pressed against the cartridges, and, having moved just the length of one cartridge, has pushed one of the same into an empty chamber of the breech-piece, ready to sweep the same out by the next motion. The lock-spring T has been thrown out of gear by the stop or projection *w* on the rod O, as before described, leaving the breech-piece D at liberty to be turned around by the next movement. The pin V has likewise left the arm X, whereby the ramming-hammer M has come out of the chamber of the breech-piece D. Now press the lower part of the hammer from you until the piece *y* (in connection with the trigger Z) abuts against the stop or catches, when the hammer will be whole-cocked and ready to be again discharged.

By the act of cocking the spring P of the spiral rod O has been compressed, the spiral rod pressed in, and, therefore, through the connecting-arm S the rack E is moved forward, bringing the piston W in connection with the next tooth in said rack. The pin V in the spiral rod O has passed through one of the spiral slots K on the outside of the revolving breech-piece D, and thereby turned the same one-sixth around. A chamber containing a fresh charge is thus brought opposite the gun-barrel, and an empty chamber in a line with the cartridge-barrel. The lock-spring T has likewise been set at liberty, and the pin *e* has entered one of the center holes of the breech-piece D, locking the latter firmly to the frame C. The cleaning-brush R has been brought by the rack E out of the chamber in the breech-piece, and thereby cleaned the same ready for a new charge. The pin V, after having turned the breech-piece D, acts now upon the arm X of the ramming-hammer M and pressed the latter thereby on the cartridge, by which the same is brought home. If the trigger Z be now pulled again the gun will be discharged a second time, and the whole of the above-described action repeated, and this, it will be perceived, can be performed in as quick succession as may be desired and as long as any cartridges remain in the barrel B. When the cartridge-barrel B is empty then pull the thumb-ring *n*, thereby bringing the top end *s* clear of the teeth *l* in the rack E, when the piston W may be slid out of the cartridge-barrel B, which may be again filled with cartridges, and proceed as above described.

Should it be required to take any of the cartridges out of the chamber of the revolving breech-piece D, the same can be done by disengaging either the ramming-hammer M or the sweeping-brush R.

Instead of the lower box or tube, *x*, which contains the spring-rod O, with its spring, the sliding piece, &c., the same may be taken away and changed by placing the spring directly round the rack E, as represented in Figs. 10 and 11. The revolving breech-piece D has in that case six spiral grooves cut on the inside of its center hole. The pin V, to work in these grooves, turning thereby the breech-piece D, is then attached to the rack E. A slot is then made in the center piece, Y, to allow the pin V to pass through the same. The rack E is in that case acted upon by a projection, *u*, (shown in dotted lines in Fig. 2,) fastened to the hammer L.

Instead of the rack E, a screw with a very coarse pitch may be used, running the whole length of the barrels, and where the rack E is, in the present instance, having, instead of the connecting-arm S, gearing which will be moved by the hammer L when the gun is fired off. The piston W is in that case worked by the screw. The advantage of this is principally that, while by the use of the rack the cartridges must all be of equal length, in this arrangement I can increase or diminish the amount of motion of the piston W so as to suit the length of the cartridges.

I do not claim the barrel B containing the charges; but

I claim—

1. The application of the rack E, situated between the gun-barrel A and the cartridge-barrel B, and the construction of the piston W in connection with said rack, for the purpose of pressing the cartridge into the revolving breech-piece, substantially as described.

2. I do not claim the needle for the purpose of igniting the priming; but I claim the spiral spring round the needle, together with the jointed arm *b*, at the upper end of the hammer L, constructed as set forth, and acting upon the needle in such a manner that after said jointed arm has pressed the needle sufficiently far into the cartridge to ignite the priming said arm is forced upward, allowing thereby the needle to spring suddenly back and pass under the arm by the action of the spring, by which any heating of the needle is prevented.

3. I do not claim the revolving breech-piece with spiral grooves on the outside circumference; but I claim revolving the breech-piece by the pin V in the manner substantially as described—*i. e.*, when the said pin is so constructed and arranged that it will rotate after the revolution of the breech-piece, and turn over at the moment it shall have passed the spiral groove and return to its former position, inclined as described.

4. I claim the ramming-hammer M, worked in the manner and for the purpose herein set forth.

In testimony whereof I have hereunto subscribed my name this 28th day of April, 1856.

EDWARD LINDNER.

In presence of—

JOHN A. STEMMLER,

JOHN N. KATZENMAYER.